(12) United States Patent
Nedderman (10) Patent No.: US 7,428,870 B1
(45) Date of Patent: Sep. 30, 2008

(54) APPARATUS FOR CHANGING THE ATTACK ANGLE OF A CAVITATOR ON A SUPERCAVATATING UNDERWATER RESEARCH MODEL

(75) Inventor: William H. Nedderman, Middletown, RI (US)

(73) Assignee: The United States America as represented by the Secretary of the Navy, Washington, DC (US)

( * ) Notice: Subject to any disclaimer, the term of this patent is extended or adjusted under 35 U.S.C. 154(b) by 561 days.

(21) Appl. No.: 11/183,146

(22) Filed: Jul. 18, 2005

(51) Int. Cl.
*F42B 15/20* (2006.01)

(52) U.S. Cl. .................... 102/399; 114/20.1; 114/21.1; 244/3.22

(58) Field of Classification Search ................ 102/399, 102/501, 503, 517; 114/20.1, 20.2, 21.1, 114/23; 244/3.1, 3.22
See application file for complete search history.

(56) References Cited

U.S. PATENT DOCUMENTS

| | | | | |
|---|---|---|---|---|
| 3,069,112 A * | 12/1962 | Patterson | .................... | 244/3.19 |
| 3,276,411 A * | 10/1966 | Stedman et al. | ................ | 114/23 |
| 3,706,293 A * | 12/1972 | Hancks et al. | .............. | 114/20.1 |
| 3,867,893 A * | 2/1975 | Saholt et al. | ................ | 114/20.1 |
| 4,111,382 A * | 9/1978 | Kissinger | .................... | 244/3.1 |
| 4,399,962 A * | 8/1983 | Wedertz et al. | ............ | 244/3.23 |
| 4,579,298 A * | 4/1986 | Thomson | .................... | 244/3.21 |
| 4,793,571 A | 12/1988 | Kranz | | |
| 4,998,994 A * | 3/1991 | Schmidt et al. | .............. | 244/3.1 |
| 5,050,819 A | 9/1991 | Moskovitz | | |
| 5,139,216 A * | 8/1992 | Larkin | ........................ | 244/3.21 |
| 5,186,117 A * | 2/1993 | Stallard, III | ................. | 114/330 |
| 5,631,442 A | 5/1997 | Becker et al. | | |
| 5,708,232 A * | 1/1998 | Nedderman, Jr. | ............ | 114/23 |
| 5,915,694 A * | 6/1999 | Brum | ......................... | 273/359 |
| 5,929,370 A | 7/1999 | Brown et al. | | |
| 5,955,698 A | 9/1999 | Harkins et al. | | |
| 6,364,248 B1 * | 4/2002 | Spate et al. | ................. | 244/3.23 |
| 6,405,653 B1 * | 6/2002 | Miskelly | ..................... | 102/374 |
| 6,739,266 B1 * | 5/2004 | Castano et al. | .............. | 102/399 |
| 7,262,394 B2 * | 8/2007 | August | ....................... | 244/3.3 |

* cited by examiner

*Primary Examiner*—Michael J. Carone
*Assistant Examiner*—Benjamin P Lee
(74) *Attorney, Agent, or Firm*—James M. Kasischke; Michael P. Stanley; Jean-Paul A. Nasser (57) ABSTRACT

An apparatus for changing the angle of attack of a cavitator on a supercavitating underwater research model. The apparatus has a nose assembly that has a pivotable cavitator tilt plate, an actuator member and a drive system engaged with the actuator member to drive the actuator member so as to tilt the cavitator tilt plate to a desired angle. Power components are remotely located and accessible to an operator so as to enable an operator to vary the angle of the cavitator tilt plate while the supercavitating underwater research model is underwater and in motion.

15 Claims, 7 Drawing Sheets

APPARATUS FOR CHANGING THE ATTACK ANGLE OF A CAVITATOR ON A SUPERCAVATATING UNDERWATER RESEARCH MODEL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention generally relates to an apparatus for changing the attack of a cavitator on a supercavitating underwater research model.

2. Description of the Prior Art

Supercavitating underwater vehicles and projectiles are known in the art. One such supercavitating underwater projectile is described in Harkins et al., U.S. Pat. No. 5,955,698. This projectile uses a supercavitating nose section that provides a cavitation bubble of sufficient size to encompass the body of the projectile which reduces hydrodynamic drag. The cavitating nose section described in the Harkins et al. is a fixed position cavitating nose section and cannot be maneuvered so as to vary the angle of attack of the projectile. Brown et al., U.S. Pat. No. 5,929,370 discloses another underwater projectile having a fixed-position nose assembly.

The development of supercavitating underwater vehicles depends heavily upon supercavitating underwater research models. Typically, the supercavitating underwater research model is positioned in a large tow tank that is filled with water. In order to change the angle of attack of the supercavitating underwater research model, the tow tank must be drained so as to enable personnel to adjust some of the mechanical components on the nose assembly. However, this is a time consuming endeavor because a significant amount of time is needed to fill and drain the tow tank. What is needed is an apparatus that that can vary the angle of attack of the cavitator on a supercavitating underwater research model while the tow tank is filled with water and the supercavitating underwater research model is still in motion. The prior art discloses several moveable nose assemblies, however, such assemblies are not suitable for use with supercavitating underwater research models. For example, Patterson, U.S. Pat. No. 3,069,112 discloses a missile nose assembly that pivots about the missile's longitudinal axis. Thomson, U.S. Pat. No. 4,579,298 discloses a pivotable nose assembly having a plurality of pivoting actuators that are coupled to the nose's base. Kranz, U.S. Pat. No. 4,793,571 discloses a pivotable nose assembly having a plurality of actuating plungers coupled to an end plate of the nose. Moskovitz, U.S. patent No. discloses a rotatable nose assembly for an aircraft. Becker et al., U.S. Pat. No. 5,631,442 discloses a pivotable warhead assembly having a plurality of bellows that cooperate to cause a charge to pivot about a ball joint. None of these prior art patents disclose an apparatus that addresses the aforementioned problem of changing the angle of attack of a supercavitating underwater research model while such model is in motion and underwater.

SUMMARY OF THE INVENTION

It is therefore an object of the present invention to provide an apparatus that can efficiently, quickly and accurately vary the angle of attack of a supercavitating underwater research model while the research model is in motion.

It is another object of the present invention to provide an apparatus that can vary the angle of attack of a supercavitating underwater research model that is inexpensive to manufacture and implement.

It is a further object of the present invention to provide an apparatus that can vary the angle of attack of a supercavitating underwater research model from a remote location.

Other objects and advantages of the present invention will be apparent from the ensuing description.

Thus, the present invention is directed to an apparatus for changing the angle of attack of a cavitator on a supercavitating underwater research model. The apparatus comprises a nose assembly that has a pivotable cavitator tilt plate, an actuator rod engaged with the cavitator tilt plate, and a drive system for driving the actuator rod so as to tilt the cavitator tilt plate to a desired angle. Power components are remotely located and accessible to an operator so as to enable an operator to vary the angle of the cavitator tilt plate while the supercavitating underwater research model is in motion.

In one aspect, the present invention is directed to an apparatus for changing the angle of attack of a cavitator on a supercavitating underwater research model. The apparatus generally comprises a nose assembly having a pivotable cavitator tilt plate and a watertight compartment, an actuator member that is supported by the nose assembly and has a first distal end movably attached to the cavitator tilt plate and a second distal end opposite the first distal end and located within the watertight compartment, and a drive system positioned in the watertight compartment for axially moving the actuator member in a first direction and in a second direction that is opposite the first direction. The drive system has inputs for receiving electrical power signals that control the drive system to move the actuator member in a desired direction. The apparatus further comprises an electrical power system positioned at a remote location for providing the electrical power signals to the drive system when the supercavitating underwater research model is either at standstill or in motion. Thus, the apparatus of the present invention allows the angle of attack of the cavitator to be changed even when the tow tank is filled with water and the supercavitating underwater research model is submerged therein.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DESCRIPTION OF THE PREFERRED EMBODIMENTS

Figure 1:
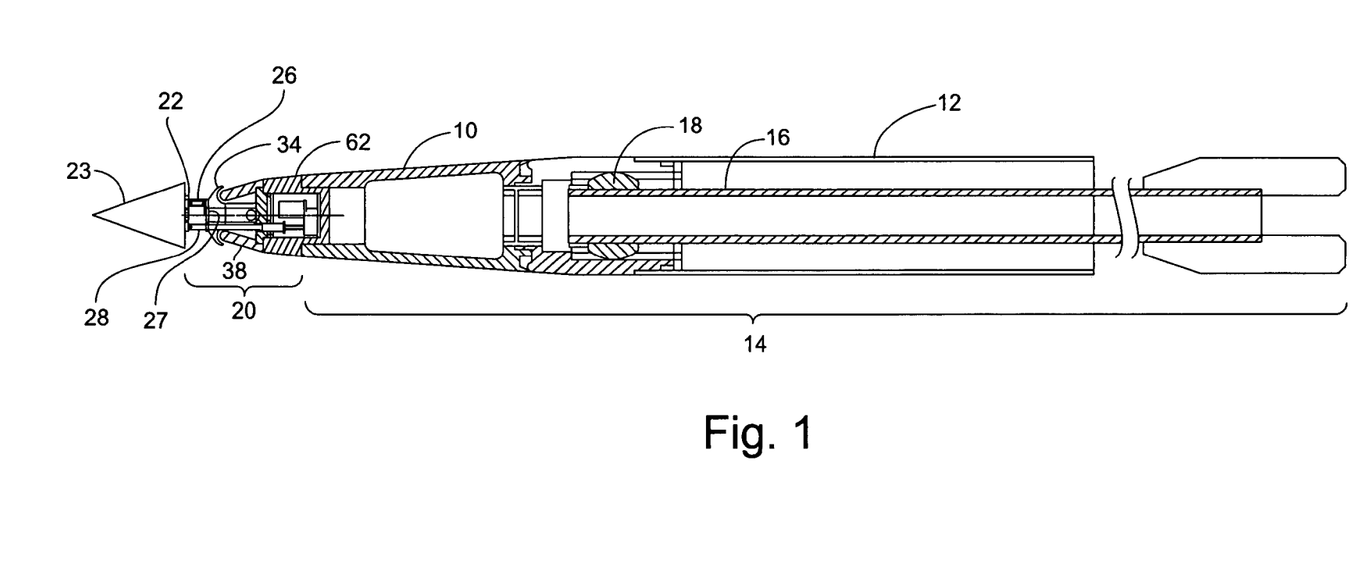
FIG. 1 is a side elevational view, in cross-section, of a supercavitating underwater research model that utilizes the apparatus of the present invention.

Although the apparatus of the present invention is configured to be used with a super cavitating underwater research model, the ensuing description is in terms of the supercavitating underwater research model being simulated by other components and structures. Referring to FIG. 1, the supercavitating underwater research model is simulated by forward shell 10 and aft shell 12. Forward shell 10 is connected to aft shell 12 to form a simulated super-cavitating underwater research model 14 (hereinafter "model 14"). Model 14 is supported by sting 16. Aft shell 12 covers sting 16 to simulate the length an actual super-cavitating underwater research model. Sting 16 is attached to model 14 by a ball joint assembly 18. The other end of sting 16 is fastened to a strut (not shown). The apparatus of the present invention comprises nose assembly 20 which is sized to partially fit in forward shell 10.

Figure 2A:
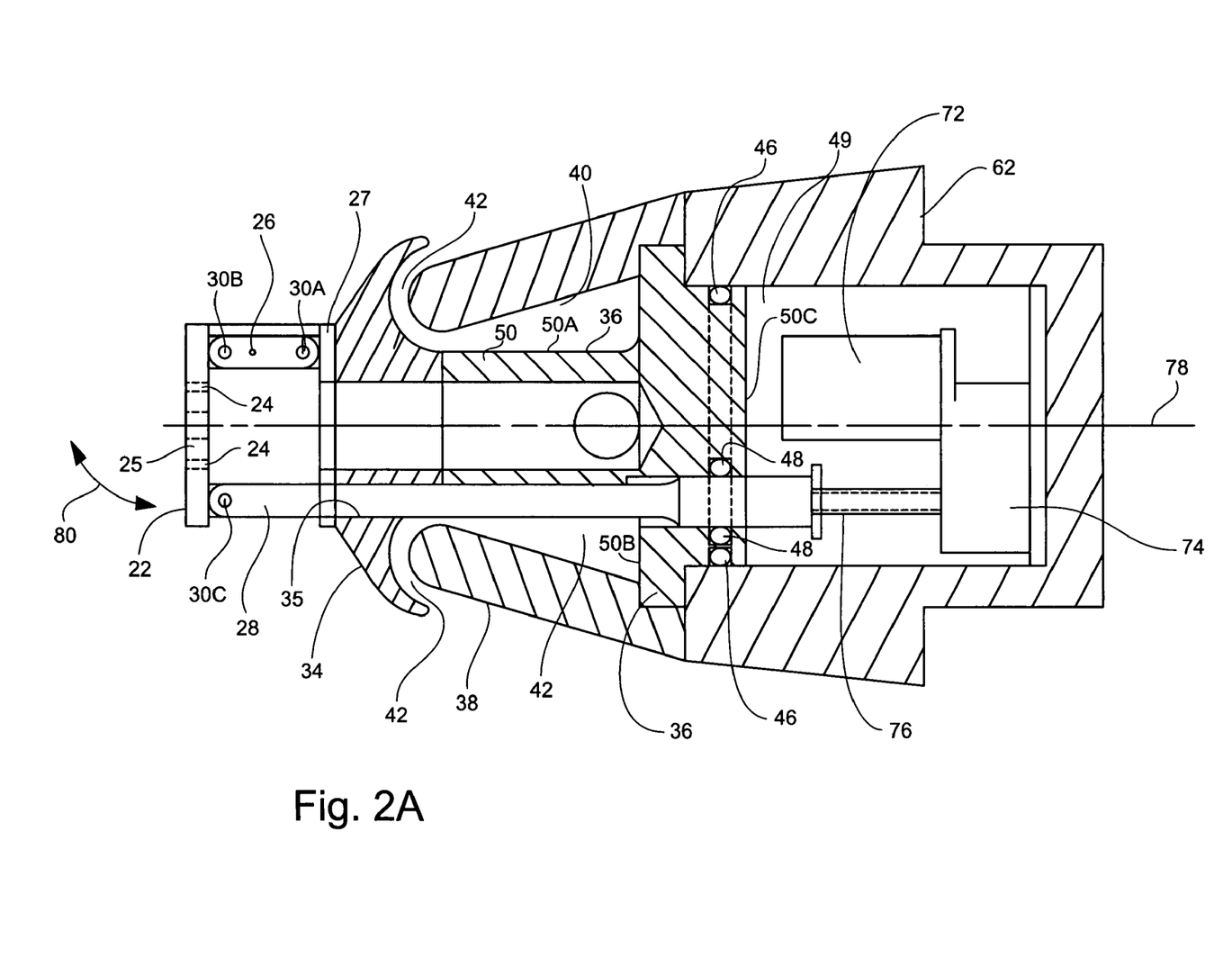
FIG. 2A is a cross-sectional view of a nose assembly in accordance with one embodiment of the apparatus of the present invention.
Figure 2B:
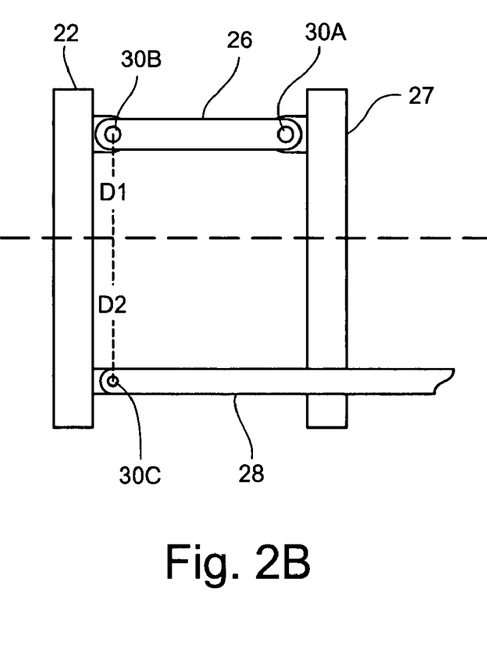
FIGS. 2B and 2C illustrate the mechanical operation of a cavitator tilt plate, a link member, and actuator rod that are shown in FIG. 2A.
Figure 2C:
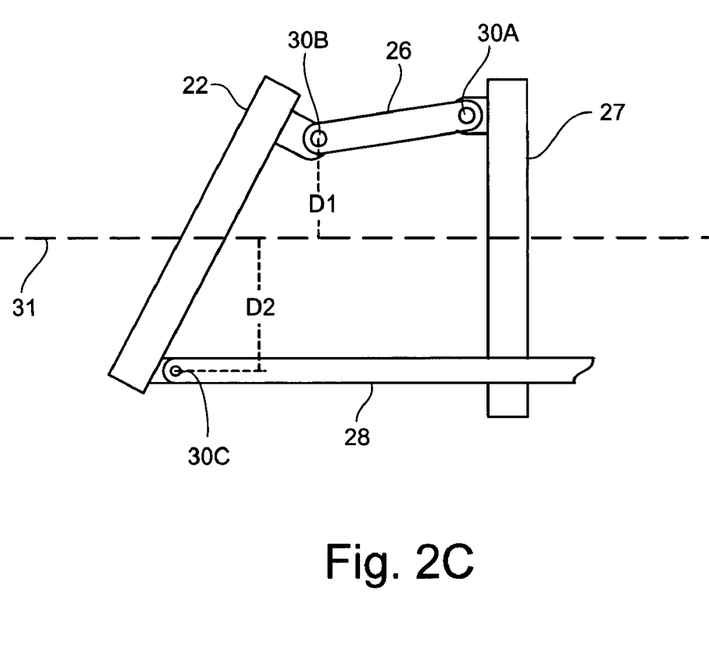

Referring to FIGS. 1, 2A, 2B and 2C, there is shown a cross-sectional view of nose assembly 20. Nose assembly 20 comprises cavitator tilt plate 22 to which cone cavitator 23 is attached. In one embodiment, cone cavitator 23 is attached to cavitator tilt plate 22 by corrosion-resistant nuts and bolts (not shown). Cone cavitator 23 is shown in a neutral position (see FIG. 1). Cavitator tilt plate 22 has several different mounting-holes 24 for mounting different types of cone cavitators. Cavitator tilt plate 22 includes central opening 25 for receiving wiring and cables. Nose assembly 20 includes link member 26, base plate 27 and actuator rod 28. Base plate 27 functions as a load bearing member for actuator rod 28. Link member 26 is pivotally attached to base plate 27 at pivot pin joint 30A. Cavitator tilt plate 22 is pivotally attached to link member 26 and actuator rod 28 by pivot pin joints 30B and 30C, respectively. In one embodiment, pivot pin joints 30A, 30B and 30C are hinge-style pin joints. The attachment of cavitator tilt plate 22, link member 26 and actuator rod 28 in this manner reduces stress on actuator rod 28. This is illustrated in FIGS. 2B and 2C. When cavitator tilt plate 22 is in the neutral position and substantially parallel to base plate 27, the distance D1 between pivot pin 30B and reference center line 31 is generally equal to the distance D2 between pivot pin 30C and reference center line 31. When actuator rod 28 moves outward so as to pivot cavitator tilt plate 22, the force created by actuator rod 28 pushing cavitator plate 22 outward causes link member 26 to pivot downward about pivot pin 30A. As a result, the distance D1 decreases and pivot pin 30B moves closer to reference center line 31. However, the distance D2 remains substantially the same thereby substantially eliminating any stress or strain on actuator rod 28 or on any of the pivot pins 30A, 30B and 30C.

Referring to FIGS. 1 and 2A, nose assembly 20 further includes deflector 34 which has opening 35 sized for receiving actuator rod 28. Cavitator tilt plate 22 and link member 26 are secured to deflector 34 by base plate 27. Nose assembly 20 includes cover 36 to which deflector 34 is attached. Cover 36 is described in detail in the ensuing description. Nose assembly 20 further includes plenum ring 38. Plenum ring 38 is attached to housing 62 (described in the ensuing description) and circumferentially extends about and is spaced from the cover plate 36 and deflector 34. The space between plenum ring 38 and cover plate 36 defines plenum 40 for the collection of gas. The space between plenum ring 38 and deflector 34 define passage 42 which is in gaseous communication with plenum 40. Passage 42 is used to introduce gas into plenum 40. A gas source (not shown), such as a gas generator, is used to introduce gas into plenum 40 or into other locations in nose assembly 20 or model 14 that are in gaseous communication with plenum 40.

Figure 4:
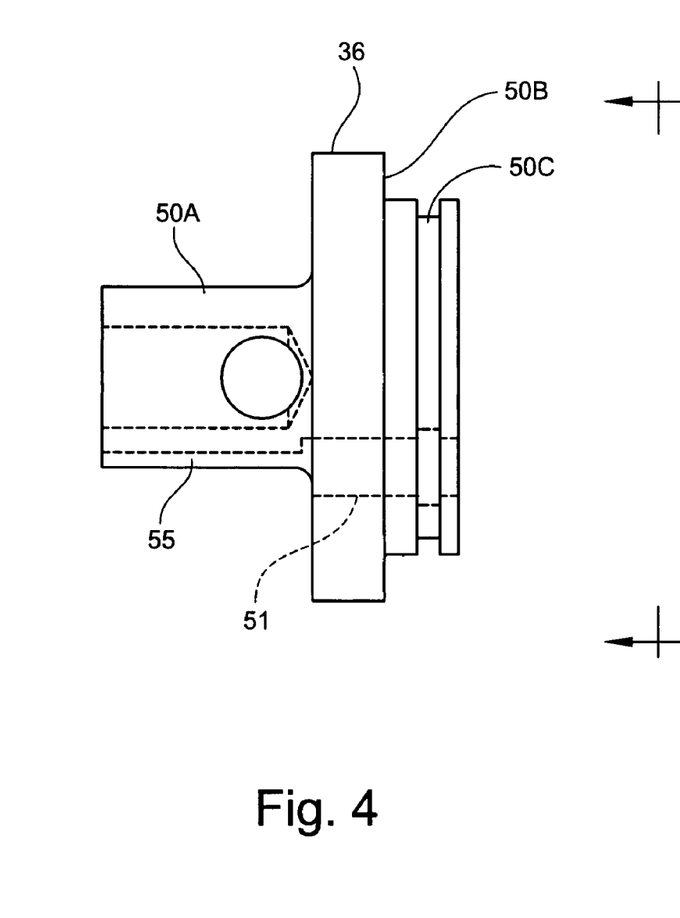
FIG. 4 is a side elevational view of a cover plate shown in FIGS. 1 and 2A.
Figure 5:
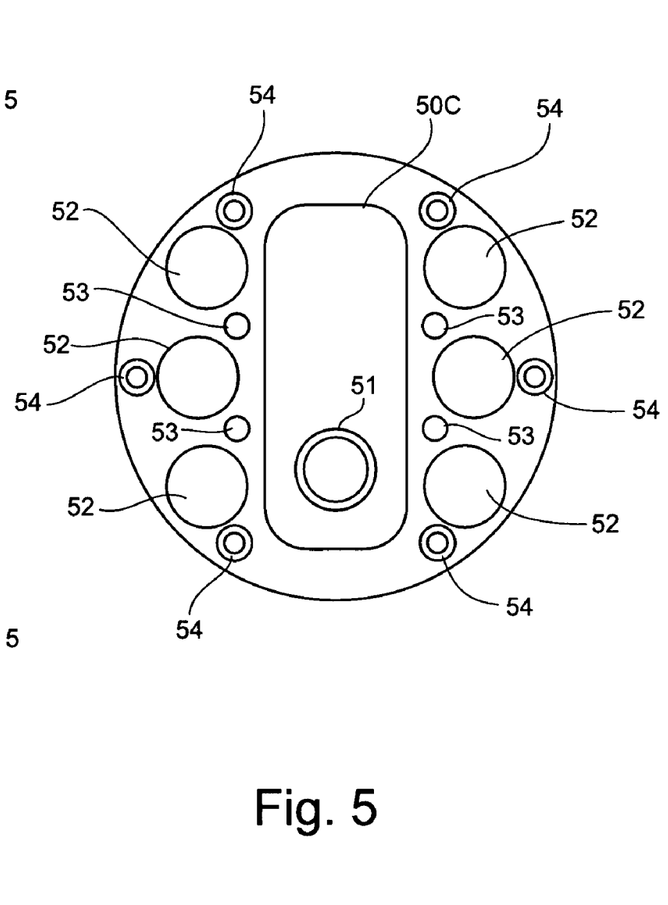
FIG. 5 is a view taken along line 5-5 in FIG. 4.

Referring to FIGS. 2A, 4 and 5, nose assembly 20 includes "O" ring seal members 46 and 48. Seal 46 seals the connection between cover 36 and housing 62 so as to make compartment 49 watertight. Seal 48 seals the entrance of actuator rod 28 into compartment 49. Cover 36 further includes a hollow extending portion 50A, generally annular body portion 50B, and end portion 50C. Deflector 34 is attached to hollow extending portion 50A. Cover 36 also includes through-hole 51 for receiving actuator rod 28, and openings 52 for the distribution of wires and cables that are connected to electronics (not shown) that are mounted on cavitator tilt plate 22. Cover 36 includes through-holes 53 that extend through cover 36 and are in gaseous communication with plenum 40 and function as gas passages. Cover 36 further includes openings 54 sized for receiving fastening screws (not shown). In one embodiment, cover 36 also includes portion 55 that is cut out or notched so as to provide operational space for actuator rod 28.

Figure 6:
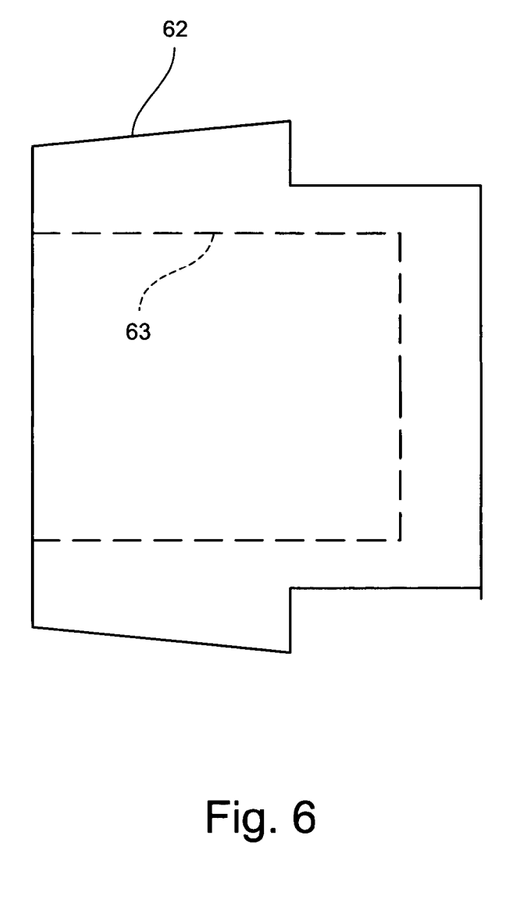
FIG. 6 is a side elevational view of a housing shown in FIGS. 1 and 2A.
Figure 7:
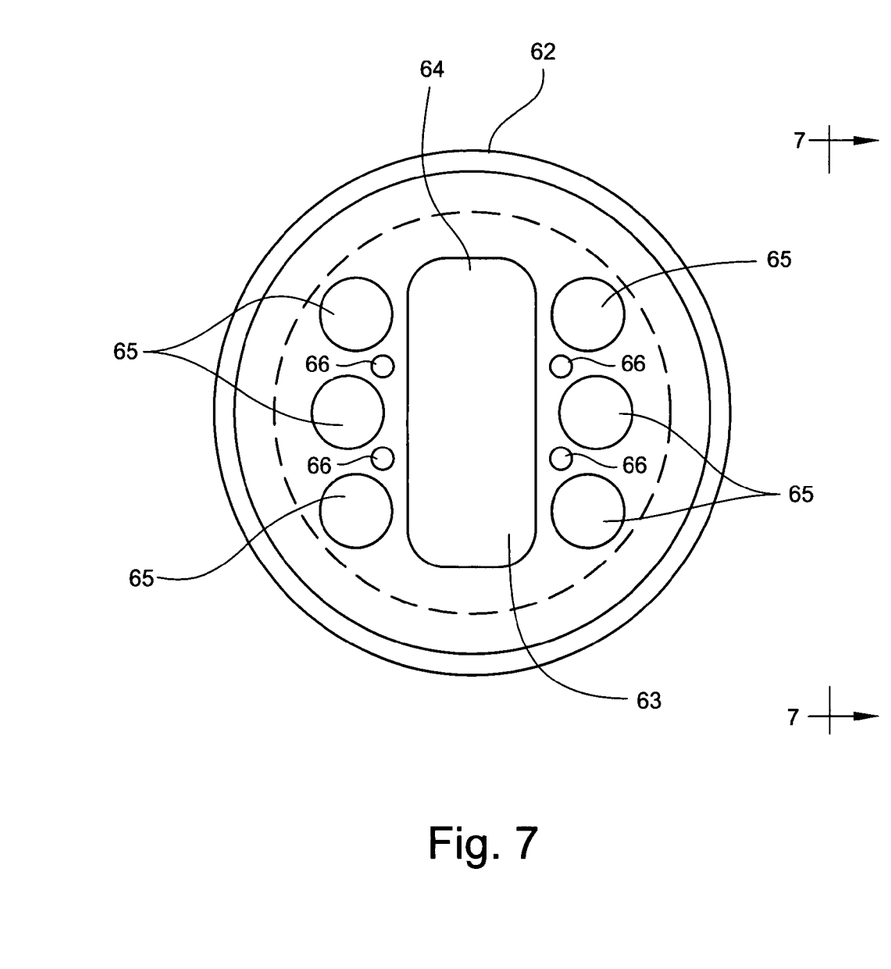
FIG. 7 is a view taken along line 7-7 in FIG. 6.

Referring to FIGS. 2A, 6 and 7, nose assembly 20 includes housing 62. Housing 62 comprises hollow center portion 63 (shown in phantom in FIG. 6) that is in communication with opening 64. Hollow center portion 63 cooperates with end portion 50C of cover 36 and seal 46 to provide watertight compartment 49. Housing 62 has a plurality of through-holes 65 to allow the passage of wiring and tubing. Through-holes 65 are aligned with corresponding through-holes 52 on cover 36. Housing 62 further includes a plurality of threaded through-holes 66 to which gas lines are attached. Through-holes 66 are substantially aligned with corresponding through-holes 53 in cover 36.

Figure 3:
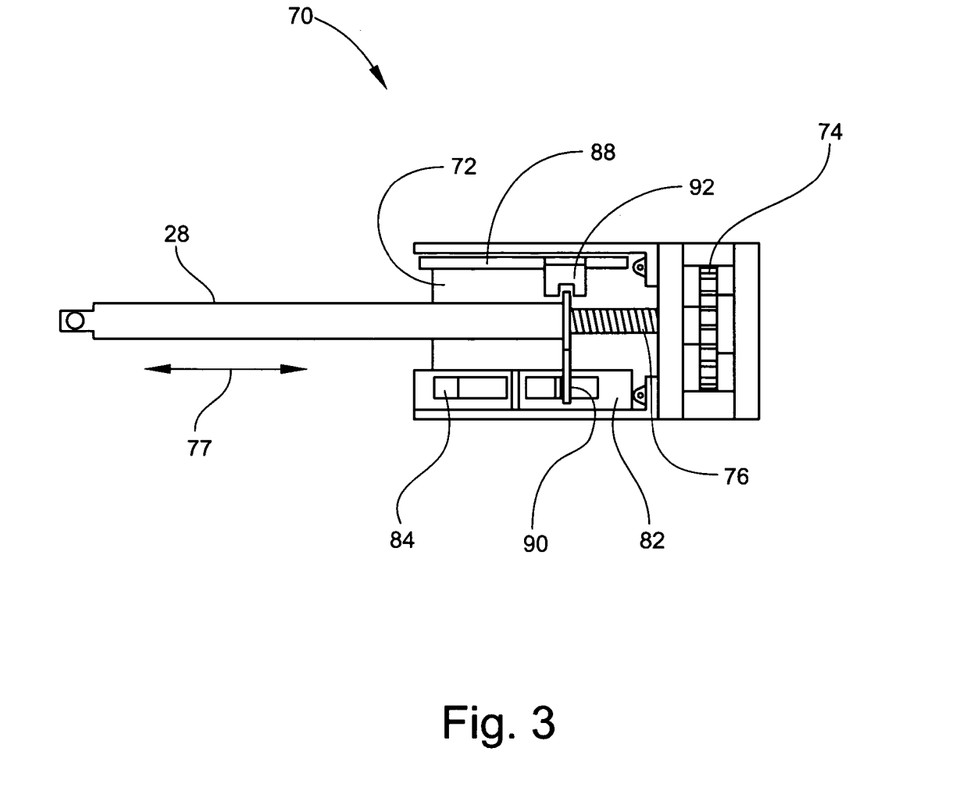
FIG. 3 is a diagram illustrating a drive system of the apparatus of the present invention.
Figure 8:
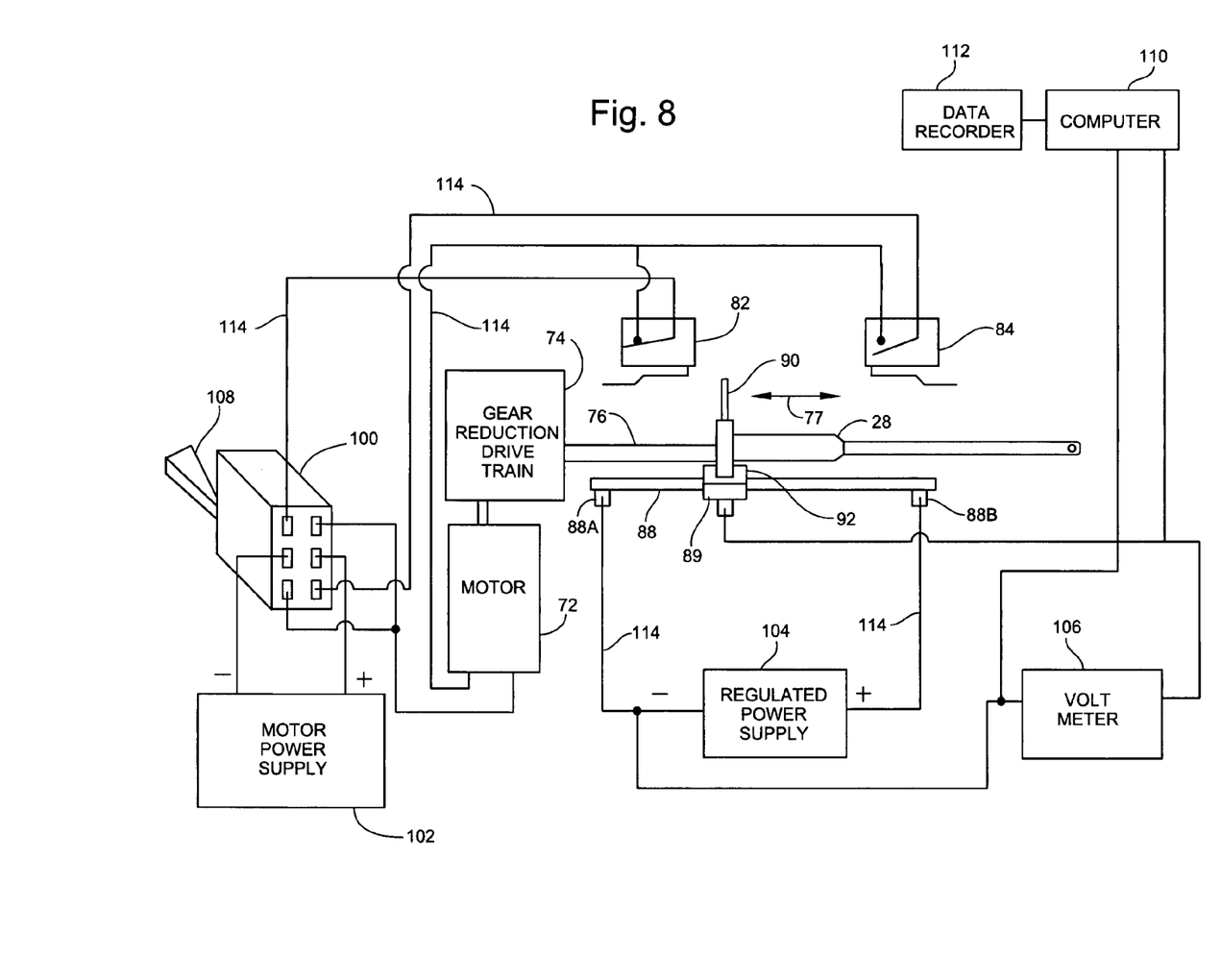
FIG. 8 is a schematic diagram illustrating an electrical power system that powers the drive system shown in FIGS. 2A and 3.

Referring to FIGS. 2, 3, and 8, the apparatus of the present invention further includes drive system 70. Drive system 70 generally comprises motor 72, gear reduction drive train 74, and lead screw 76. In one embodiment, motor 72 comprises a 24 volt motor. However, motors having other suitable voltage ratings can be used as well. FIG. 8 also shows remotely located power components that control the operation of drive system 70. These power components are described in the ensuing description. Drive system 70 is engaged with actuator rod 28 and moves actuator rod 28 bi-directionally in an axial direction, indicated by arrow 77 in FIGS. 3 and 8. Specifically, motor 72 drives gear reduction drive train 74. Gear reduction drive train 74 drives lead screw 76 which, in turn, axially moves actuator rod 28. The movement of actuator rod 28 is generally parallel to reference axis 78. As a result, actuator rod 28 pivots cavitator tilt plate 22 back and forth in the direction indicated by arrow 80 in FIG. 2A. Drive system 70 further comprises limit switches 82 and 84 that limit the movement of actuator rod 28. Limit switch 82 functions as an "in" limit switch and is normally closed. Limit switch 84 functions as an "out" limit switch and is normally open. When either limit switch 82 and 84 is tripped, electrical power to motor 72 is shut off. Drive system 70 includes linear potentiometer 88, the purpose of which is discussed in the ensuing description. Actuator rod 28 includes projecting member 90 that extends from actuator rod 28. As actuator rod 28 nears its inward travel limit, projecting member 90 trips limit switch 82. When switch 82 is tripped, electrical power to motor 72 is shut off. As actuator rod 28 nears its outward travel limit, projecting member 90 trips limit switch 84 thereby shutting off the electrical power to motor 72. Linear potentiometer 88 includes terminals 88A and 88B and slide 89 that is connected to fastening device 92. Fastening device 92 connects slide 89 of linear potentiometer 88 to actuator rod 28 so that slide 89 moves along with actuator rod 28. Linear potentiometer 88 is mounted to housing 62 with any suitable mounting device or technique. Thus, linear potentiometer 88 senses the position of the actuator rod 28.

Referring to FIGS. 1 and 8, the power components used to power drive system 70 are not located in compartment 49 but are external to nose assembly 20 and accessible to a user or operator of model 14. The power components include switch 100, motor power supply 102, regulated power supply 104 and volt meter 106. The user or operator of model 14 can increase or decrease the angle of cone cavitator 23 by activating switch 100 in the appropriate manner. Thus, the manner in which switch 100 is activated determines whether actuator rod 28 moves cavitator tilt plate 22 outward or retracts cavitator tilt plate 22. In a preferred embodiment, switch 100 is a momentary double pole double throw (DPDT) toggle switch. In order to move actuator rod 28 outward so as to increase the angle of attack of cone cavitator 23, the operator pushes switch lever 108 in a first direction. As a result, current travels through one side of switch 100, through limit switch 82, to motor 72, back to the other side of switch 100 and then back to motor power supply 102. Motor 72 operates in a first operational state until actuator rod 28 nears the end of its outward travel limit and closes limit switch 84. In order to decrease the angle of cone cavitator 23, actuator rod 28 must be retracted. The user or operator accomplishes this by maneuvering switch lever 108 in an opposite direction in order to reverse the polarity of the voltage applied to motor 72 so that motor 72 operates in a second operational state that is opposite the first operational state. As a result, current flows through switch 100, through limit switch 82, through the other side of switch 100 and then to motor power supply 102. Thus, motor 72 operates in the second operational state until actuator rod 28 nears the end of its inward travel limit and limit switch 82 is opened. This configuration allows the operator to achieve fine adjustment of the angle of cavitator cone 23. The angle of cone cavitator 23 is measured via linear potentiometer 88, regulated power supply 104, and volt meter 106. Regulated power supply 104 provides a voltage to potentiometer terminals 88A and 88B. The voltage at slide 89 of linear potentiometer 88 is compared to the total voltage applied to linear potentiometer 88 at terminals 88A and 88B. Voltage meter 106 measures the voltage between slide 89 and ground potential. At any given moment, the voltage measured between slide 89 and ground potential corresponds to a particular distance in which actuator rod 28 has moved. This particular distance corresponds to a particular angle of cone cavitator 23. A conversion procedure is used wherein the voltage measured at slide 89 is converted to a distance (e.g. inches, feet, centimeters, etc.), which is the distance actuator rod 28 has moved, and this distance is then converted into the resulting angle of cavitator cone 23. In a preferred embodiment, drive system 70 is calibrated before any test data is recorded in order to ensure that the conversion procedure is updated to reflect any fluctuations in component performance due to temperature or component tolerances. In one embodiment, the conversion procedure can be accomplished with a computer or microprocessor 110 and data recorder 112. In such an embodiment, computer 110 receives the voltage measured at slide 89 from voltmeter 106 and converts the measured voltage to angle data that represents the angle of the cone cavitator 23. The angle data is then outputted into data recorder 112. In such an embodiment, voltmeter 106 is configured as a digital voltmeter having a digital output. Cables or wires 114 are connected between drive system 70 and the remotely located electrical component and thus, are in contact with the water or fluid in the tow tank. Thus, cables or wires 114 are preferably moisture resistant or water-proof. During testing of the present invention, ball joint assembly 18 (see FIG. 1) allowed model 14 to pitch and yaw as the angle of cone cavitator 23 was varied. In an alternate embodiment of the invention, nose assembly 20 and the associated power components can be modified to operate as a two-axis system wherein cone cavitator 23 can be moved along two axes. In such an alternate embodiment, a second motor and second actuator rod are used to achieve movement of cone cavitator 23 in two dimensions. In a further embodiment, an air cylinder is used in instead of actuator rod 28. In such an embodiment, a generator is used to introduce pressurized gas into the air cylinder and plenum 40. The gas bleed-off from the air cylinder is then fed to plenum 40.

The apparatus of the present invention allows the angle of cone cavitator 23 to be accurately and rapidly set to a desired angle while model 14 is submerged in water and in motion. The angle of cone cavitator 23 can be set, determined and recorded from a remote location while model 14 is in motion thereby eliminating the need to drain the tow tank. Since the cone cavitator angle can be changed while model 14 is in motion, the resulting dynamics of the change in attack angle can be observed. Nose assembly 20 has supplemental gas ventilation (i.e. through-holes 53 and 66) for transporting gasses to the front of model 14. The dimensions of through-holes 53 and 66 can be varied so as to accommodate different gas flow rates. Ventilation holes not used are easily blocked by suitable techniques known in the art. Nose assembly 20 has wire passages to receive instrumentation cabling, sensors and other instrumentation. Watertight compartment 49 prevents water damage to such cabling, sensors and instrumentation as well as other components of drive system 70. Nose assembly 20 is compact, can be easily transported, and has flexibility for mounting many different sensors and load cells.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered exemplary in nature and not as limiting the scope and spirit of the invention as set forth in the attached claims.

What is claimed is:

1. An apparatus for changing the angle of attack of a cavitator on a supercavitating underwater research model, comprising:

a nose assembly defining a watertight compartment therein wherein the nose assembly comprises:

a housing surrounding said watertight compartment and an opening in communication with said watertight compartment;

a cover plate attached to the housing to cover the opening in the housing, the housing, cover plate and interior defining the watertight compartment; and a deflector attached to the cover plate such that the cover plate is between the deflector and the housing;

a plenum ring attached to the housing and circumferentially extending about and spaced from the cover plate and deflector, the space between the plenum ring and the cover plate defining a plenum for the collection of gas and the space between the plenum ring and deflector defining a passage in communication with the plenum for introducing gas into the plenum, and wherein the housing and cover plate each have gas inlet means for introducing gas into the plenum;

a pivotable cavitator tilt plate positioned on said nose assembly for attaching to the cavitator;

an actuator member supported by the nose assembly and having a first distal end movably attached to the cavitator tilt plate and a second distal end opposite the first distal end and located within the watertight compartment;

a drive system positioned in the watertight compartment joined to move the actuator member in a first direction and in a second direction that is opposite the first direction, the drive system having electrical control inputs for controlling the drive system; and an electrical power system positioned at a remote location and joined to the drive system.

2. The apparatus according to claim 1 further comprising means for providing data that represents the angle of the cavitator tilt plate.

3. The apparatus according to claim 1 wherein the cover plate has a through-hole in communication with the watertight compartment and wherein the actuator member extends through and is supported by the through-hole.

4. The apparatus according to claim 3 wherein the nose assembly further comprises a pair of seal members, one of the seal members sealing the connection between the cover plate and the housing and the other seal member sealing the through-hole through which the actuator member extends so as to waterproof the compartment.

5. The apparatus according to claim 1 wherein the drive system comprises:
   a motor;
   a gear reduction drive train engaged with the motor and the actuator member; and
   an electrical circuit to provide a voltage signal that represents the distance in which the actuator member has moved.

6. The apparatus according to claim 5 wherein the electrical circuit comprises a linear potentiometer having a slide that is attached to the actuator member.

7. The apparatus according to claim 6 wherein the electrical power system comprises:
   a first power supply providing power to the motor; and
   a switch circuit that has a first switch configuration that configures the first power supply to cause the motor to operate in a first operational state that moves the actuator member in the first direction, and a second switch configuration that configures the first power supply to cause the motor to operate in a second operational state that moves the actuator member in the second direction.

8. The apparatus according to claim 7 wherein the electrical power system further comprises:
   a second power supply providing power to the electrical circuit; and
   a measuring device for measuring the voltage signal provided by the electrical circuit.

9. The apparatus according to claim 8 further comprising a device for converting the voltage signal measured by the measuring device into angle data that defines the angle of the cavitator tilt plate.

10. The apparatus according to claim 9 further comprising a data recorder for recording the angle data.

11. The apparatus according to claim 9 wherein the device comprises a computer.

12. An apparatus for changing the angle of attack of a cavitator on a supercavitating underwater research model, comprising:
   a nose assembly defining a watertight compartment therein wherein the nose assembly comprises:
   a housing surrounding said watertight compartment and an opening in communication with said watertight compartment;
   a cover plate attached to the housing to cover the opening in the housing, the housing, cover plate and interior defining the watertight compartment;
   a deflector attached to the cover plate such that the cover plate is between the deflector and the housing;
   a base plate attached to the deflector such that the deflector is between the cover plate and the base plate;
   a pivotable cavitator tilt plate positioned on said nose assembly for attaching to the cavitator;
   an actuator member supported by the nose assembly and having a first distal end movably attached to the cavitator tilt plate and a second distal end opposite the first distal end and located within the watertight compartment;
   a drive system positioned in the watertight compartment joined to move the actuator member in a first direction and in a second direction that is opposite the first direction, the drive system having electrical control inputs for controlling the drive system; and
   an electrical power system positioned at a remote location and joined to the drive system.

13. The apparatus according to claim 12 wherein the cavitator tilt plate is pivotally attached to the base plate.

14. The apparatus according to claim 13 wherein the nose assembly further comprises a link member pivotally attached to and between the base plate and the cavitator tilt plate.

15. The apparatus according to claim 14 further comprising a plenum ring attached to the housing and circumferentially extending about and spaced from the cover plate and deflector, the plenum ring, cover plate and the deflector defining a plenum for the collection of gas, the plenum ring and deflector defining a passage in communication with the plenum.

* * * * *